United States Patent [19]

Haggerty

[11] Patent Number: 4,796,195
[45] Date of Patent: Jan. 3, 1989

[54] METHOD FOR MACHINING WITH IMPROVED ACCURACY

[75] Inventor: William A. Haggerty, Cincinnati, Ohio

[73] Assignee: Cincinnati Milacron Inc., Cincinnati, Ohio

[21] Appl. No.: 49,182

[22] Filed: May 13, 1987

[51] Int. Cl.[4] ................... G06F 15/46; G05B 23/02
[52] U.S. Cl. ...................... 364/474.35; 318/572; 364/474.37; 364/551.02
[58] Field of Search .............. 364/474, 475, 167–171, 364/550, 551, 560, 571; 318/572, 567, 569; 33/503, 504, 505

[56] References Cited

U.S. PATENT DOCUMENTS

| | | | |
|---|---|---|---|
| 3,605,909 | 9/1971 | Lemelson | 173/3 |
| 3,641,849 | 2/1972 | Kinney | 82/1 |
| 4,190,889 | 2/1980 | Etoh et al. | 364/474 |
| 4,370,721 | 1/1983 | Berenberg et al. | 364/474 |
| 4,382,215 | 5/1983 | Barlow et al. | 364/474 X |
| 4,384,332 | 5/1983 | McMurtry | 364/474 |
| 4,554,495 | 11/1985 | Davis | 364/474 X |
| 4,561,050 | 12/1985 | Iguchi | 364/474 X |
| 4,638,232 | 1/1987 | Stridsberg et al. | 364/474 |

Primary Examiner—Joseph Ruggiero
Attorney, Agent, or Firm—John W. Gregg

[57] ABSTRACT

A method is provided for effecting numerically controlled machining operations at a predetermined location. A reference feature is fixed proximate to the predetermined location and the location of a reference surface thereon is measured prior to machining to produce reference surface signals representing the coordinates of the reference surface. Location correction signals are produced in response to the reference surface signals, the location correction signals representing the difference between the measured location of the reference surface and the actual location thereof. The machining operation is performed in response to the location correction signals to effect the machining operation at the predetermined location.

4 Claims, 2 Drawing Sheets

4,796,195

METHOD FOR MACHINING WITH IMPROVED ACCURACY

BACKGROUND OF THE INVENTION

This invention relates generally to numerically controlled machining. In particular, this invention relates to methods for improving accuracy of machining operations conducted under numerical control.

Assuming that there is no lost motion in the machine member drive and that machine member motion is true in the commanded axis, the precision with which machine positioning can be effected by numerically controlled machines is limited by the resolution of the servo mechanisms which effect motion of the machine members. The accuracy with which machining operations can be effected is dependent on these servo mechanisms and other influences such as the deflection, yielding, or bending of machine members relative to the workpiece and thermal deformation of machine members, workpieces, fixtures and tools. The accuracy of the servo mechanisms is relatively constant over time while the other phenomena are dynamic. Therefore, error correction techniques which assume constant errors over the life of the machine are ineffective to correct for errors which are caused by phenomena which vary during normal machine operation. Corrections for such errors may be produced by inspecting a finished workpiece. However, this approach presumes that the inspection of the finished workpiece be accomplished with better accuracy than the accuracy achieved in the machining. This approach has the added disadvantage that the inspected workpiece may be finished with irreparable errors.

SUMMARY OF THE INVENTION

In light of the foregoing, it is an object of this invention to provide a method of effecting numerical control machining operations at predetermined locations irrespective of dynamic influences on the accuracy of positioning machine members relative to a workpiece.

It is a further object of the present invention to provide a method for improving the accuracy of machining operations performed by a numerically controlled machine by automatically measuring and recording coordinates of a reference feature proximate a predetermined location immediately prior to performing a machining operation at the predetermined location.

It is a still further object of the present invention to provide a method of effecting numerically controlled machine operations at a predetermined location in response to programmed coordinates of the location and position compensation values determined from reference features proximate said predetermined location.

It is a still further object of the present invention to provide a method of controlling a numerically controlled machine to effect a machining operation at a predetermined location by creating coordinate compensation values in response to measurement of reference surfaces proximate to the predetermined location.

Further objects and advantages of the present invention shall be made apparent in the following description and shall be shown in the attached drawings.

In accordance with the aforesaid objects, a method is provided for effecting numerically controlled machining. A program is created defining a cycle of operation for machining a workpiece comprising location coordinates and function commands to effect machining operations at predetermined locations. The program includes measurement instruction blocks to effect measurement of locations of reference surfaces proximate to selected predetermined locations. Reference surface signals representing measured coordinates of the reference surfaces are recorded and location correction signals are created in response to calculation instruction blocks. The location correction signals represent the difference between the reference surface signals and actual location signals representing the coordinates of the actual location of the reference surfaces. The programmed location coordinates of the selected predetermined locations are modified by the location correction signals to cause the machine operations to be performed at the predetermined locations irrespective of dynamic influences on the accuracy of positioning of machine members relative to the workpiece.

DETAILED DESCRIPTION OF THE PREFERRED EMBODIMENT

Figure 1:
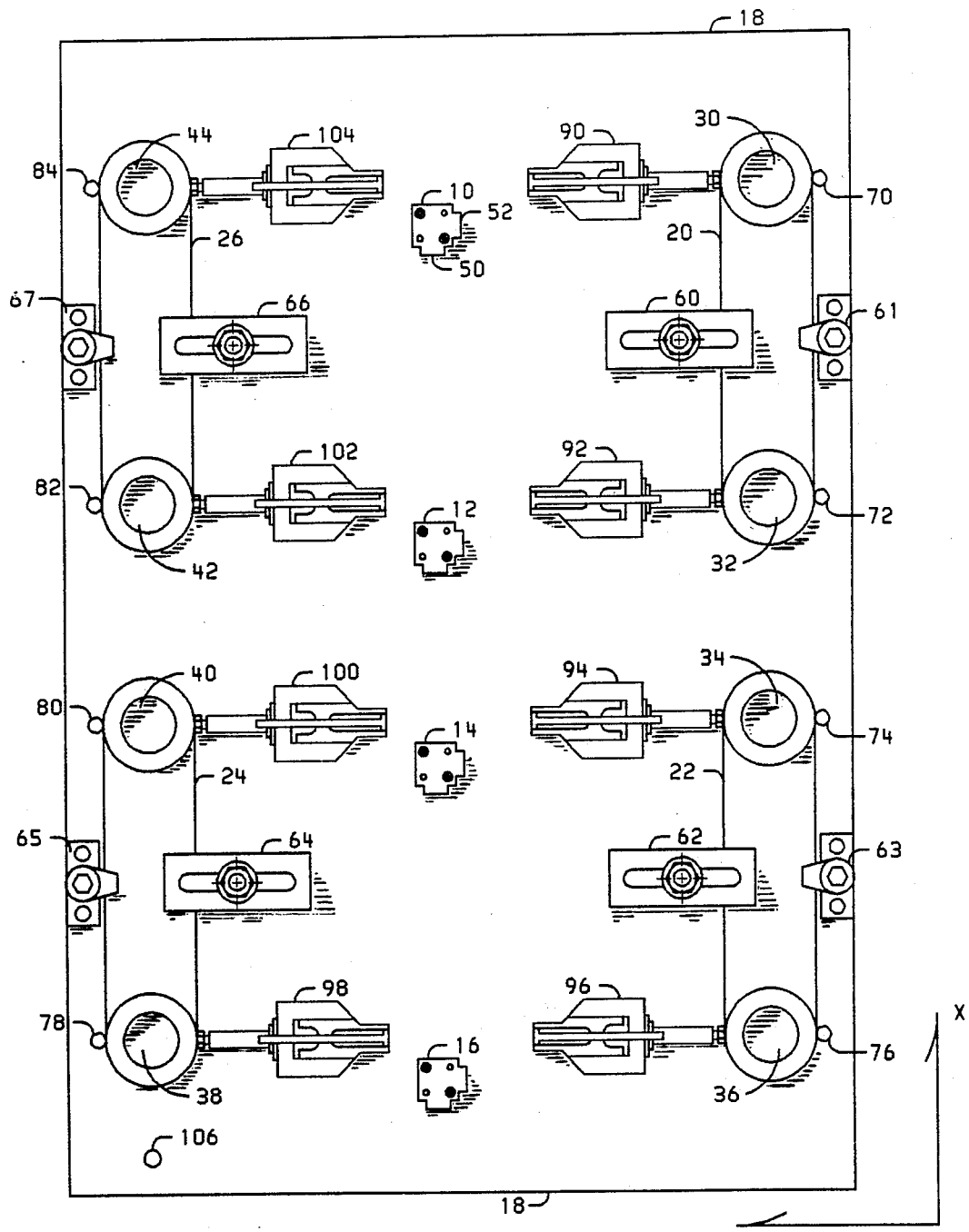
FIG. 1 shows an arrangement of workpieces and reference blocks.

The present invention shall be described in detail with reference to a preferred embodiment as illustrated in the drawings. It is to be understood that the particular structure of the preferred embodiment is not to be construed as a limitation on the present invention. Rather, it is intended that the invention be construed to include all modifications, alterations and equivalents following within the spirit and scope of the appended claims.

A machine control method for modifying programmed positions by using a programmably controlled surface sensing element is illustrated in U.S. Pat. No. 4,370,721 issued 25 Jan. 1983 and assigned to Cincinnati Milacron Inc., the assignee of the present invention. The method illustrated therein provides for the accumulation of data of surface locations at selected points, wherein the surfaces to be measured are unmachined workpiece surfaces. The present invention is concerned with the measurement of locations of reference surfaces and the creation of location correction data for modification of programmed locations. To the extent that U.S. Pat. No. 4,370,721 illustrates methods for sensing surfaces in response to programmed instructions, the accumulation of location data, and the modification of programmed coordinates for machine operations, the disclosure of the specification and drawings of that patent are incorporated herein by reference.

The spatial relationship between the reference surfaces to be sensed and the predetermined location of a machining operation shall be described with reference to FIG. 1. Four workpieces 20, 22, 24, and 26 are mounted to a fixture plate 18. The workpieces are held in position on fixture plate 18 by a combination of hold down clamps 60 through 67, locating pins 70 through 84, and releasable clamps 90 through 104. Each of the workpieces 20 through 26 includes two diameters, for example, bores 30 and 32, which are to be bored so as to maintain the relative center distance between the finished bores within a narrow tolerance of the specified center distance. The dimensions of the workpieces 20 through 26 and their arrangement on the fixture plate 18 are such that influences on accuracy such as thermal deformation of the workpiece and machine members and yielding or bending of machine members, can impact the relative positioning between the machine and the workpiece at a selected bore such as bore 32 by different amounts than at a second predetermined location such as bore 30. Therefore, reference features are provided proximate the bores 30 through 44 with known locations upon the fixture plate 18.

Specifically, reference blocks 10, 12, 14 and 16 are mounted to fixture plate 18 so as to position reference surfaces such as, surfaces 50 and 52 of reference block 10 at predetermined locations relative to the locating pin 106. The reference blocks 10 through 16 are mounted so that the reference surfaces are parallel to axes of motion such as, for example, the X and Y axes of motion of machine members as shown by the X and Y coordinate system shown in FIG. 1. The reference blocks 10 through 16 are located in such proximity to the centers of bores 30 through 44, such as the proximity of reference block 10 to bores 30 and 44, that positioning errors detected at the reference surfaces 50, 52 will be within an acceptable tolerance of positioning errors at the bores 30 and 44. Therefore a location correction calculated from a reference surface is adequate to correct positioning errors at the programmed locations of bores 30 and 44.

FIG. 4 is an isometric drawing of reference block 10 showing the reference surfaces 50 and 52. The reference block 10 is provided with holes 110, 112, 114, 116 for mounting to fixture plate 18. The reference surfaces 50 and 52 are machined flat, ground, and hardened to provide smooth, flat surfaces for detection by a numerically controlled surface sensing element. The surface blocks 10 through 16 are precisely located on fixture plate 18 by pins (not shown) through holes 110 and 114, to align the reference surfaces precisely at predetermined locations relative to the locating pin 106. The reference block is mounted to fixture plate 18 by bolts (not shown) through counter-bored holes 112 and 116.

The numerical control program for boring the diameters 30 through 44 is written to provide reference surface measurement instructions and error correction calculation instructions prior to the machining operation instructions for those bores. The program advantageously includes surface sensing instruction blocks such as those illustrated in U.S. Pat. No. 4,370,721 to effect the numerically controlled detection of the location of the reference surfaces by a surface sensing element. In response to such surface sensing or measurement instruction blocks, the numerical control automatically records reference surface signals representing coordinates of the reference surfaces. In addition, the program would advantageously include an offset calculation instruction block such as shown in U.S. Pat. No. 4,370,721. The numerical control automatically produces location correction signals in response to the offset calculation instruction, the location correction signals representing the difference between the measured coordinates of the reference surfaces and the known coordinate of the reference surface represented by actual location signals provided with the offset calculation instruction block.

To insure the accuracy of the center of the boring operations performed on diameters 30 and 44, the locations of reference surfaces 50 and 52 of reference block 10 would be measured in advance of the performance of the machining operations at these two diameters. The measurement and calculation must be performed proximately to the time of execution of the machine operation to minimize effects of thermal change from the instant of measurement of the instant of machining. The measurement of all reference surfaces and calculation of all offsets may be performed before any machining is performed or these functions may be distributed within the machining program, depending upon the expected time required to perform the machining operations. The machining operation instruction block is programmed with the appropriate offset address to automatically effect the modification of program coordinates for the machining operation by the calculated offsets.

Figure 2:
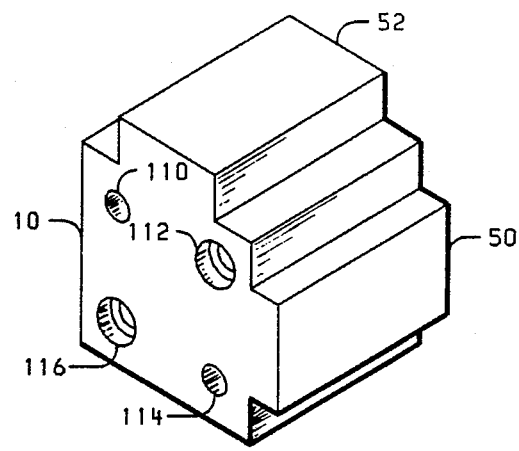
FIG. 2 shows the reference surfaces on a reference block shown in FIG. 1.
Figure 3:
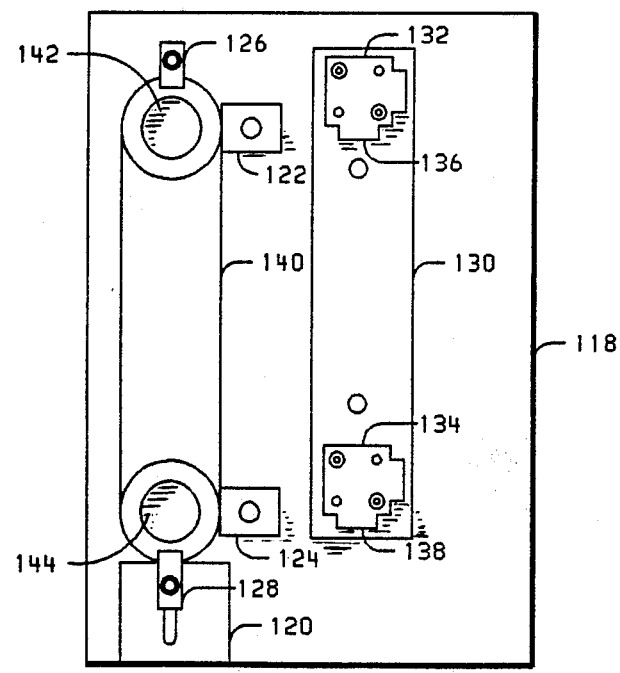
FIG. 3 shows an alternative arrangement of a workpiece and reference blocks.

An alternative arrangement for reference blocks relative to a workpiece shall be described with reference to FIG. 3. A workpiece 140 is held on a fixture plate 118 by work holding clamps 126 and 128. The workpiece is located against locating blocks 120, 122, and 124. Reference blocks 132 and 134, being the same as block 10 shown in FIG. 2, are mounted to reference mounting plate 130. The reference blocks are mounted so that the reference surfaces 136 and 138 are predeterminately located to be spaced apart the desired distance between centers of bores 142 and 144 of workpiece 140. The reference mounting plate 130 is mounted on fixture plate 118 to locate the reference surface 138 on the centerline of the bore 144. The programmed location of the center of bore 144 is corrected by determining a location correction value from reference block 134 as described hereinbefore. To maintain the desired center spacing, a correction for the location of the center of bore 142 is then determined by calculating a location correction from the location of reference surface 136.

It will be appreciated that while the invention has been illustrated with use of reference blocks, separate from a workpiece, the above procedure could be used if a workpiece were provided with a reference feature, having a known precise relative location to workpiece locating surfaces. Reference surfaces on the reference feature may then be used to correct programmed coordinates of a machining operation. Reference feature may be provided as permanent elements of workpiece fixturing equipment, as features of the workpieces or as reference blocks as illustrated in the preferred embodiment.

As will be appreciated by those skilled in the art, the number of reference surfaces required, the arrangement of reference surfaces, and the proximity of reference features to the predetermined locations of machining operations will depend upon the desired accuracy and the magnitude of positioning errors effected by such dynamic influences as machine member deflection, and thermal deformation. Although the measurement instructions necessarily increase the time of execution of the entire program, the improved accuracy of machining will in some instances eliminate the need for operations on dedicated function machines and reduce the number of workpieces not meeting specifications thus eliminating or reducing the need for rework. While the preferred embodiment has illustrated the use of reference surfaces in only two dimensions, it is to be understood that reference surfaces could be provided to accomplish accuracy improvements in three dimensions such as might be required to control the depth of blind holes. Further, while the preferred embodiment has been illustrated with reference to boring operations, it is to be understood that the techniques described herein are equally suitable for other types of machining operations.

What is claimed is:

1. A method for performing a machining operation at a predetermined location in response to a numerical control program irrespective of time variant influences affecting relative positions of a tool and workpiece, the numerical control program including a measurement instruction for measuring a location of a point, a calculation instruction for computing a magnitude of a coordinate offset, and a machining instruction for effecting a machining operation at a predetermined location, the method comprising the steps of:

(a) providing a reference feature proximate the predetermined location, the reference feature having a reference surface situated at an actual location;

(b) producing reference surface signals in response to the measurement instruction, the reference surface signals representing a measured location of the reference surface;

(c) producing location correction signals immediately subsequent to the production of the reference surface signals, the location correction signals being produced in response to the reference surface signals and the calculation instruction, the location correction signals representing a difference between the measured location of the reference surface and its actual location; and (d) performing the machining operation in response to the location correction signals and the machining operation instruction immediately subsequent to the production of the location correction signals to eliminate the effects of the time variant influences on relative positions of the tool and workpiece.

2. The method of claim 1 further comprising the step of storing the reference surface signals in response to the measurement instruction.

3. The method of claim 2 wherein the calculation instruction includes actual location signals representing the actual location of the reference surface and the step of producing location correction signals further comprises the step of calculating the difference between the stored reference surface signals and the actual location signals.

4. The method of claim 3 wherein the machining operation instruction defines the coordinates of the predetermined location and the step of performing the machining operation further comprises the steps of:

a. modifying the coordinates of the predetermined location in response to the location correction signals; and b. performing the machining operation at the predetermined location in response to the modified coordinates.

* * * * *